H. C. SMITH.
Lath Machine.
No. 9,286.
2 Sheets—Sheet 1.
Patented Sept. 28, 1852.
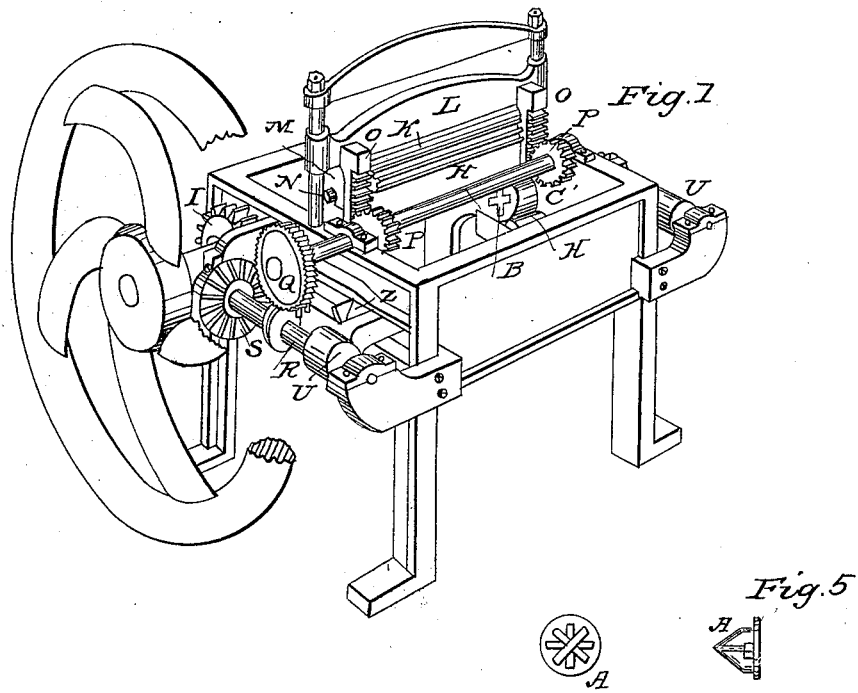
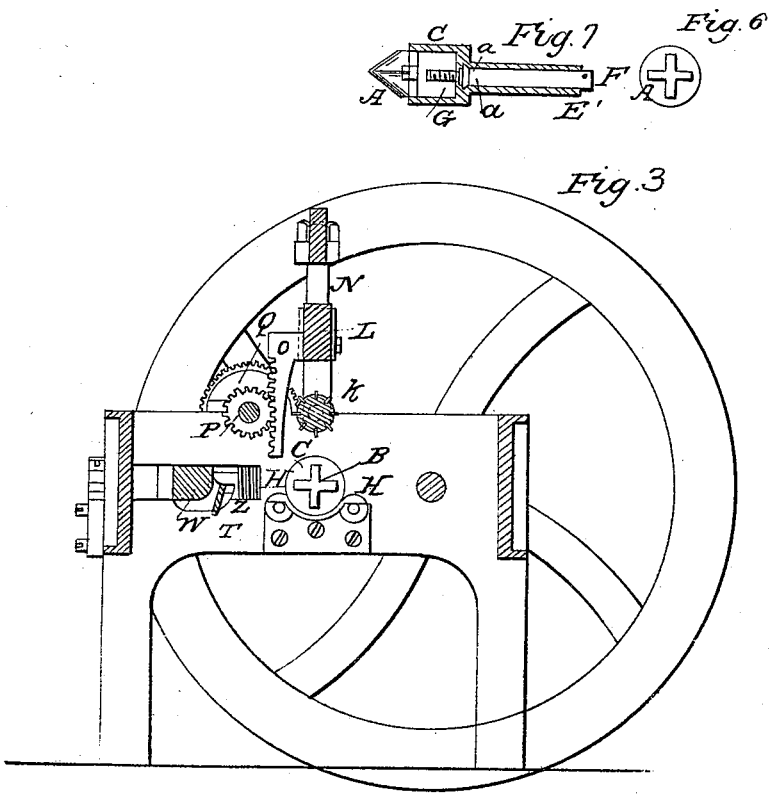

H. C. SMITH.
Lath Machine.

No. 9,286.

2 Sheets—Sheet 2.

Patented Sept. 28, 1852.

UNITED STATES PATENT OFFICE.

HENRY C. SMITH, OF CLEVELAND, OHIO.

LATH-MACHINE.

Specification forming part of Letters Patent No. 9,286, dated September 28, 1852; Reissued February 11, 1868, No. 2,859.

*To all whom it may concern:*

Be it known that I, HENRY C. SMITH, of Cleveland, in the county of Cuyahoga and State of Ohio, have invented a new and useful Improvement in the Construction of Lath-Machines; and I do hereby declare that the following is a full and exact description of the same, reference being had to the annexed drawings, making part of this specification.

The nature of my invention consists in turning the log or bolt from which the laths are to be cut by means of puppet heads or wheels arranged and operated at each end of said log or bolt, and driven by the same first moving power, or so as to have the same relative velocities, by which means all wrenching or twisting of the log upon its centers is entirely obviated, and it is firmly held up to the knives to be operated on it; and also in combining therewith, the detachable dogs, and hollow mandrel, for the purpose of clutching and releasing of the log or bolt, and for centering said bolt before it is placed upon the mandrels.

To enable others skilled in the art to make and use my invention, I will proceed to describe its construction and operation.

Figure 2:
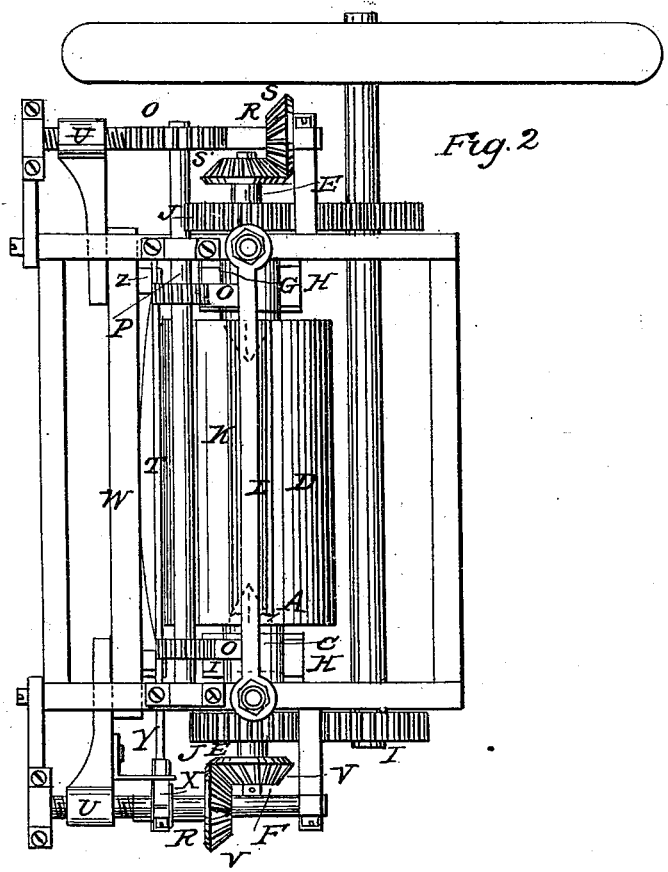
Figure 4:
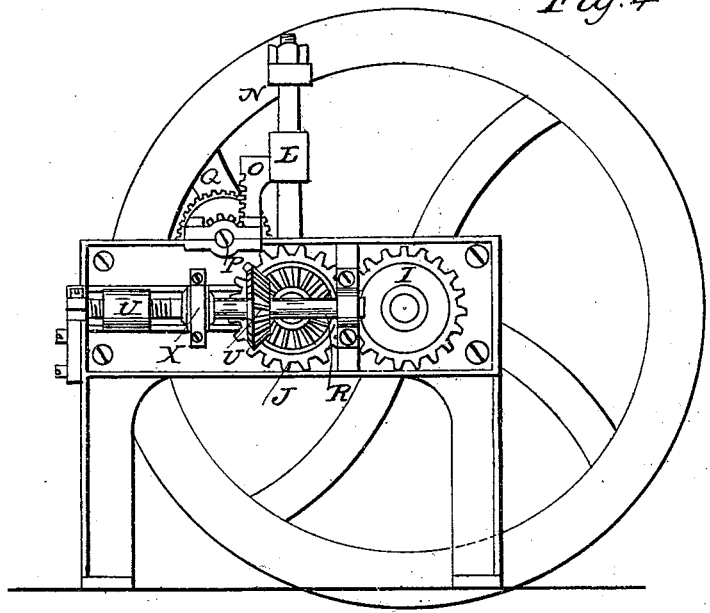

Figure 1 is a perspective view, Fig. 2 a plan view, Fig. 3 a transverse section, and Fig. 4 a side elevation; the other views will be referred to hereafter as may be required.

Like letters refer to like parts in the different views.

Before the log is placed in the machine, the dog A Fig. 5 is driven into the centers of the log. In the dogs are openings, as seen in Fig. 6, which fit to the clutches B, projecting from the bearings C C', Figs. 1, 2, and 3; a detached view of the dog and bearing C', is shown at Fig. 7, and seen in place with the log D in Fig. 2.

The bearing C', and shaft E', which forms the mandrel is hollow, for the purpose of receiving the bar F, the inside end of which screws into the clutch head, which is in the chamber of the bearing C' as seen at G Fig. 7 which represents the mandrel in section, while the bar F, barrel G, and dog A are in full. The shoulder *a*, on the bar F when said bar is turned forces the barrel and the dog forward or backward as the case may be and by this arrangement the clutches are forced into the dogs in the center of the log, and withdrawn by the same screw to remove the log, after the lath are cut off.

The bearings C C', revolve on the friction rollers H H, Figs. 1, 3, and 4, which receive the whole weight of the log, thereby relieving the shafts of the bearings from any strain.

The wheels I I', Fig. 2, are keyed to the driving shaft, and are in gear with the puppet wheels J J' on the shaft of the bearings C C', by which gearing the log is revolved by power applied at each of its ends, which obviates all wrenching and twisting upon its centers, which is invariably the case when driven from one end only.

The revolving knives K, Figs. 1 and 2, are all secured to one shaft, and receive their motion from the log, as they are forced into it longitudinally by the feed works. The knives are placed in the cross head L over the log; on the underside of the head are arms, to which is suspended the knives by the knife shaft journals; there being corresponding boxes for the journals in the arms, as seen at M Fig. 1.

The cross head and knives are retained in place parallel to the log, by the guides N N Figs. 1, 3, and 4. To the cross head is secured the racks O O, which are moved by the pinions P P on the shaft.

On the end of the pinion shaft, is the gear Q which is worked by the screw on the shaft R; the bevel gear S, is keyed to the same shaft and the corresponding gear S', is secured to the same shaft as the puppet wheel J' Fig. 2.

As the log is revolved by the power being applied to the driving shaft on which the gearing I I' is secured, a movement is given at the same time to the racks O O, for the purpose of feeding the revolving knives K into the log. The bevel gears S' V' turns with the log, the same motion being given to the shafts R R' by the bevel gears S and V. On the shaft R is a screw for the purpose of working the racks for feeding the revolving knives K, by means of the pinions P P, which are on the same shaft as the gear Q, and are moved by the screw on the shaft R. This combination constitutes the feed works for the revolving knives, and differs from the feed movements of the stripping knife Fig. 2, which strips off the lath after they are cut longitudinally by the revolving knives.

On the shafts R R', are screws which fit to corresponding screws in the knife beam arms, as seen at U U, Fig. 2. As the shafts E E' revolve with the log, by means of the bevel gears S S' and V V' the knife T is fed up to the log D by the action of the screws on the arms U U which are connected to the knife beam W which supports the knife.

The stripping knife T, is forced into the log the thickness of a lath at each revolution; to enable the knife to strip off the lath with more ease and facility a reciprocating motion is given to it by means of the eccentric X, Figs. 2 and 4, and is attached to the knife by the connecting rod Y Fig. 2.

The eccentric slips along on the shaft, as the knife is forced into the log by the screws, in the shafts R R'. Between the screw and gear V is inserted a feather key, which has a corresponding slot in the eccentric, by which the eccentric is worked, and at the same time it moves along with the knife.

The knife T is held in place by the arms Z Z as seen in Fig. 2.

Having thus fully described the nature of my invention, what I claim therein as new and desire to secure by Letters Patent, is,

The combination of the method of rotating the log or bolt from which the laths are to be cut, by means of the puppet wheels J, J', arranged respectively on the shafts E' E, which forms a part of the mandrel at each end of the log, and the gear wheels I, I', or their equivalents, moving with equal velocities, so as to prevent any wrenching or twisting of the log on its center, and to hold it firmly up to the knives while being operated upon by them, and the method of clutching and releasing the log, by means of the dog A, hollow bearing C', for containing the clutch head G, and hollow shaft E', for receiving the rod F, which screws into said clutch, and by which the dog may be driven into the log, or the log released, the whole being arranged and operating substantially in the manner, and for the purpose set forth.

H. C. SMITH.

Witnesses:
JOHN BARR,
JOHN BRAINERD.

[FIRST PRINTED 1912.]